United States Patent [19]

Rowan et al.

[11] Patent Number: 5,140,248
[45] Date of Patent: Aug. 18, 1992

[54] OPEN LOOP MOTOR CONTROL WITH BOTH VOLTAGE AND CURRENT REGULATION

[75] Inventors: Timothy M. Rowan, Wauwatosa; Russel J. Kerkman, Milwaukee, both of Wis.

[73] Assignee: Allen-Bradley Company, Inc., Milwaukee, Wis.

[21] Appl. No.: 504,110

[22] Filed: Apr. 3, 1990

Related U.S. Application Data

[63] Continuation of Ser. No. 326,483, Mar. 20, 1989, abandoned, which is a continuation of Ser. No. 137,526, Dec. 23, 1987, abandoned.

[51] Int. Cl.[5] .............................................. H02P 5/40
[52] U.S. Cl. ................................................... 318/811
[58] Field of Search ............................. 318/800-812; 363/96-98; 323/266

[56] References Cited

U.S. PATENT DOCUMENTS

| | | | |
|---|---|---|---|
| 4,158,163 | 6/1979 | Eriksen et al. | 318/798 |
| 4,227,139 | 10/1980 | Rosink et al. | 318/803 |
| 4,320,331 | 3/1982 | Plunkett | 318/805 |
| 4,400,655 | 8/1983 | Curtiss et al. | 318/729 |
| 4,420,719 | 12/1983 | D'Atre et al. | 318/803 |
| 4,451,771 | 5/1984 | Nagase et al. | 318/800 |
| 4,458,192 | 7/1984 | Sakamoto et al. | 318/806 |
| 4,503,376 | 3/1985 | Okuyama | 318/802 |
| 4,593,348 | 6/1986 | Tewesmeier | 363/85 |
| 4,680,526 | 7/1987 | Okuyama et al. | 318/805 |
| 4,680,695 | 7/1987 | Kerkman et al. | 363/160 |
| 4,683,412 | 7/1987 | Bialek . | |

OTHER PUBLICATIONS

A New Synchronous Current Regulator and An Analysis of Current Regulated PWM Inverters, Rowan-Univ. of Wisconsin-Madison and R. J. Kerkman-Allen-Bradley Co., Milwaukee, Wis. 1985 IEEE.

M. A. Abbas and D. W. Novotny, "The Stator Voltage Controlled Current Source Inverter Induction Motor Drive", Industry Applications, vol. 1A-18, No. 3, pp. 219-229, May/Jun. 1982.

B. deFornel, J. C. Hapiot, and M. Pietrzak-David, "Numerical Speed Control of a Current-Fed Asynchronous Machine by Measurement of Supply Voltages", IEE Proceedings, vol. 131, Pt. B, No. 4, pp. 165-169, Jul., 1984.

A. B. Kulkarni, J. W. Dixon, M. Nishimoto, and B. T. Ooi, "Transient Tests on a Voltage-Regulated Controlled-Current PWM Converter," IEEE Trans, on Industrial Electronics, vol. IE-34, No. 3, pp. 319-324, Aug. 1987.

Abbondanti, A. "Method of Flux Control in Induction Motors Driven by Variable Frequency, Variable Voltage Supplies", 1977, IEEE/IAS, International Semiconductor Power Converter Conference, pp. 177-184, reprinted in Bose, Adjustable Speed AC Drive Systems, IEEE Press, 1981, pp. 154-161.

*Primary Examiner*—David Smith, Jr.
*Attorney, Agent, or Firm*—Quarles & Brady

[57] ABSTRACT

An open-loop pulse width modulation (PWM) motor control for an induction motor includes a voltage regulator loop which is wrapped around a current regulator. When a load is suddenly encountered by the motor, voltage drops at the output of the current regulator. This is sensed and fed back to a voltage regulator and to a current limiter which then adjust the input signal to the current regulator to prevent an overcurrent that will trip a circuit protection device. The voltage regulator and current limiter may be implemented in either analog or digital circuitry.

9 Claims, 6 Drawing Sheets

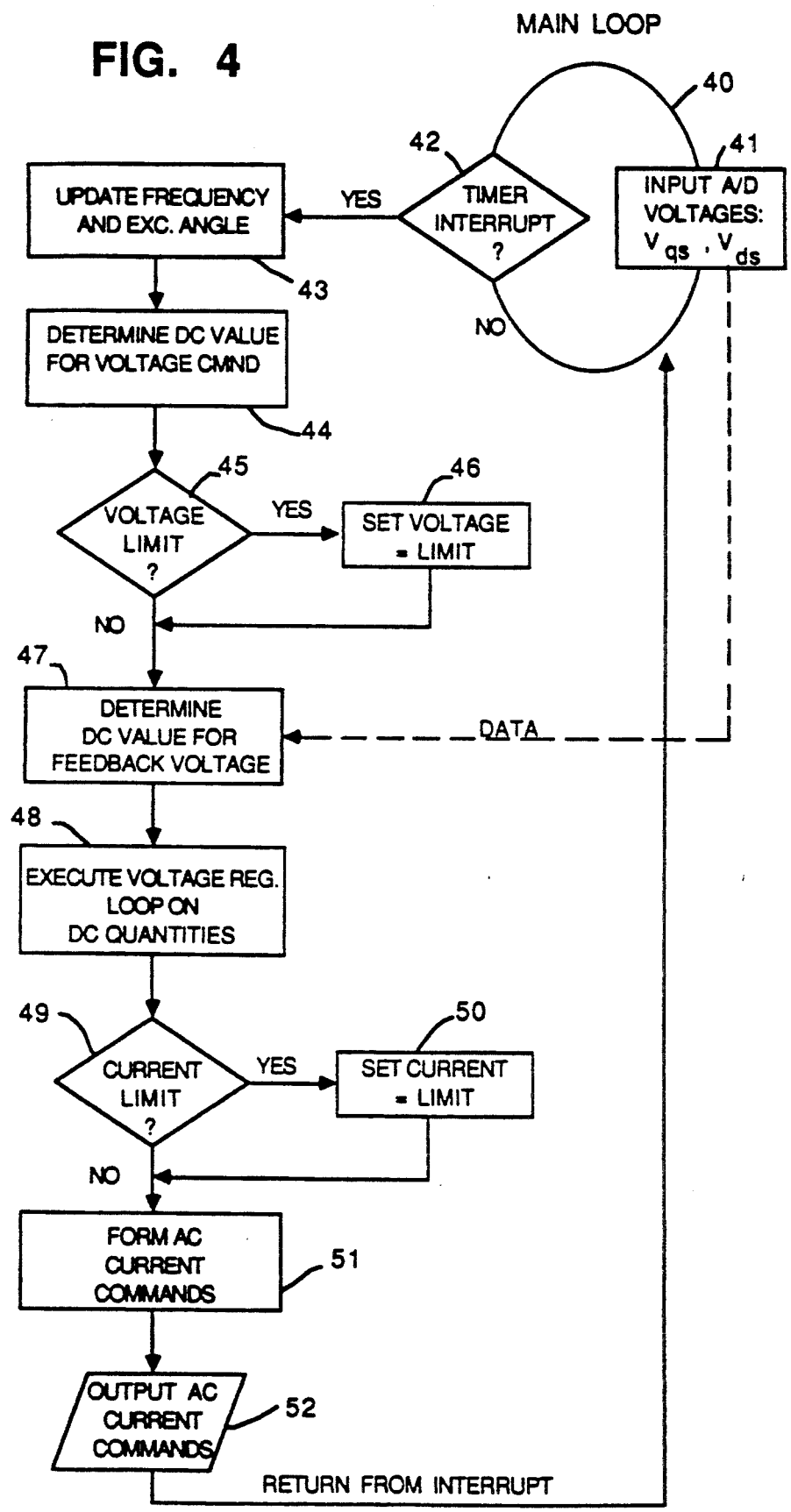

OPEN LOOP MOTOR CONTROL WITH BOTH VOLTAGE AND CURRENT REGULATION

This application is a continuation of application Ser. No. 07/326,483, filed Mar. 20, 1989 now abandoned, which is a continuation of application Ser. No. 07/137,526, filed Dec. 23, 1987 and now abandoned.

BACKGROUND OF THE INVENTION

1. Field of the Invention

The field of the invention is AC motor drives for variable speed control of AC induction motors, and more particularly, AC motor drives using pulse width modulation (PWM) techniques.

2. Description of the Background Art

A PWM motor drive for an AC induction motor includes a power section and a logic and control section. The power section includes the high voltage and current devices to convert AC input power to DC power and then, to convert the DC power to a variable frequency, PWM voltage for input to an AC motor. The logic and control section includes the low power signal processing circuits and logic circuits which control the performance characteristics of the drive. The user of the drive sets certain operating parameters through input devices interfaced to the logic and control section.

In the power section a PWM voltage inverter receives power from a 3-phase AC source operating at 60 Hz frequency. The AC power is converted to DC power to provide a source for synthesizing voltages of different frequencies which are necessary to control speed in an AC motor.

The pulse train pattern from a PWM inverter is characterized by a first set of positive pulses of equal magnitude but of varying pulse width and by a second set of negative-going pulses of equal magnitude but of varying pulse width. The RMS value of this pulse train pattern approximates one cycle of a sinusoidal signal which is characteristic of an AC waveform. The pattern is repeated to generate additional cycles of the AC waveform.

To control the frequency and magnitude of the resultant AC power signals to the motor, control signals from the logic and control section are applied to the PWM inverter.

AC motor control systems that incorporate PWM drives, can be categorized as follows: 1) a closed-loop type in which the speed of the motor is sensed with a tachometer and fed back to determine an error signal which is applied to reduce the difference between a commanded speed and the actual speed, and 2) an open-loop type which does not include a tachometer for sensing the actual speed of the motor.

The advantage of the open-loop type is lower cost, in that the tachometer is a relatively sophisticated and expensive accessory to the basic motor control. The tachometer is also sometimes difficult to connect and may cause a decrease in overall system reliability. Controls without speed sensing are considered to be "open-loop", even though other parameters such as voltage or current may be sensed.

To drive a PWM voltage inverter the motor control provides an AC signal of a certain magnitude and frequency. In one type of open-loop control, slip is roughly determined and frequency is more closely determined by predefined speed profiles, referred to as "accel/decel" rates which are selected and adjusted through switches interfaced to the logic and control section of the motor control. The speed commands are translated into torque commands by applying a specified volts/hertz ratio, which can be selected through a user-selectable switch or a jumper wire interfaced to the logic and control section of the motor control.

A PWM voltage inverter provides fast transient response to load disturbances which is a significant advantage. A second advantage is that velocity feedback is not necessary to reach a stable steady-state operating condition. However, there are times, when starting the motor or when strong load disturbances occur, when current to the motor may become excessive.

One way of controlling current at startup is to provide a current regulator which compares a commanded current to the actual current and generates an error signal to the PWM inverter to reduce the error. A current-regulated PWM (CRPWM) drive, however, does not respond as quickly as a voltage inverter to sudden and substantial load disturbances.

For overcurrent protection in a voltage inverter drive, a circuit is available for monitoring current to the motor and according to the specific condition either shutting down the motor or providing a controlled slow-down and re-acceleration to operating speed. This solution has not entirely eliminated undesirable torque oscillations during certain extreme loading conditions. Also, during light loading, it has been found that the motor may be overexcited resulting in inefficient performance. Still further, the shutting down of the motor in response to load disturbances is in some instances an unnecessary inconvenience to the motor user.

Thus, it is an object of the present invention to improve the response and control capabilities of an open-loop PWM motor control without increasing its production cost by an amount comparable to the cost of adding speed sensing equipment.

SUMMARY OF THE INVENTION

The invention relates to a motor control in which a voltage control loop is closed around a current regulator portion of a current-regulated pulse width modulation (CRPWM) drive. This provides a hybrid control, which in comparison with the unmodified CRPWM drive, provides improved startup, improved response to light load conditions and improved response to sudden load disturbances.

The control includes a PWM voltage inverter for generating a pulse width modulated voltage signal to be applied to an induction motor in response to a DC voltage signal from a DC power source and in response to an AC inverter voltage control signal.

The control also includes a current regulator for generating the AC inverter voltage control signal to control the PWM voltage inverter. The current regulator generates the AC inverter voltage control signal in response to an AC current command signal and in response to a feedback signal representative of actual current being supplied to the motor.

The control also includes a voltage regulator which controls the command to the current regulator in response to the inverter voltage control signal which is output from the current regulator. That inverter voltage control signal is representative of motor terminal voltage, so that both voltage and current at the motor terminals are sensed.

In the event of a sudden load disturbance, not only does current increase but voltage decreases—reducing the limit of maximum current that may be applied to the motor. The invention provides a voltage regulator to sense this condition and to control the command to the current regulator.

The invention can be carried out using either analog circuitry of digital circuitry for the voltage regulator. Digital circuitry offers manufacturing cost advantages in that many of the control functions can be performed by executing programmed routines rather than by processing analog signals. This reduces the size and cost of the circuit components.

Other objects and advantages besides those discussed above shall be apparent to those familiar with the art from the description of several preferred embodiments of the invention which follow. In the description, reference is made to the accompanying drawings, which form a part hereof, and which illustrate examples of the invention. Such examples, however, are not exhaustive of the various embodiments of the invention, and therefore reference is made to the claims which follow the description for determining the scope of the invention.

BRIEF DESCRIPTION OF THE DRAWINGS

FIG. 4 is a flow chart showing a program for carrying out the embodiment of FIG. 2.

DETAILED DESCRIPTION OF THE PREFERRED EMBODIMENTS

Figure 1:
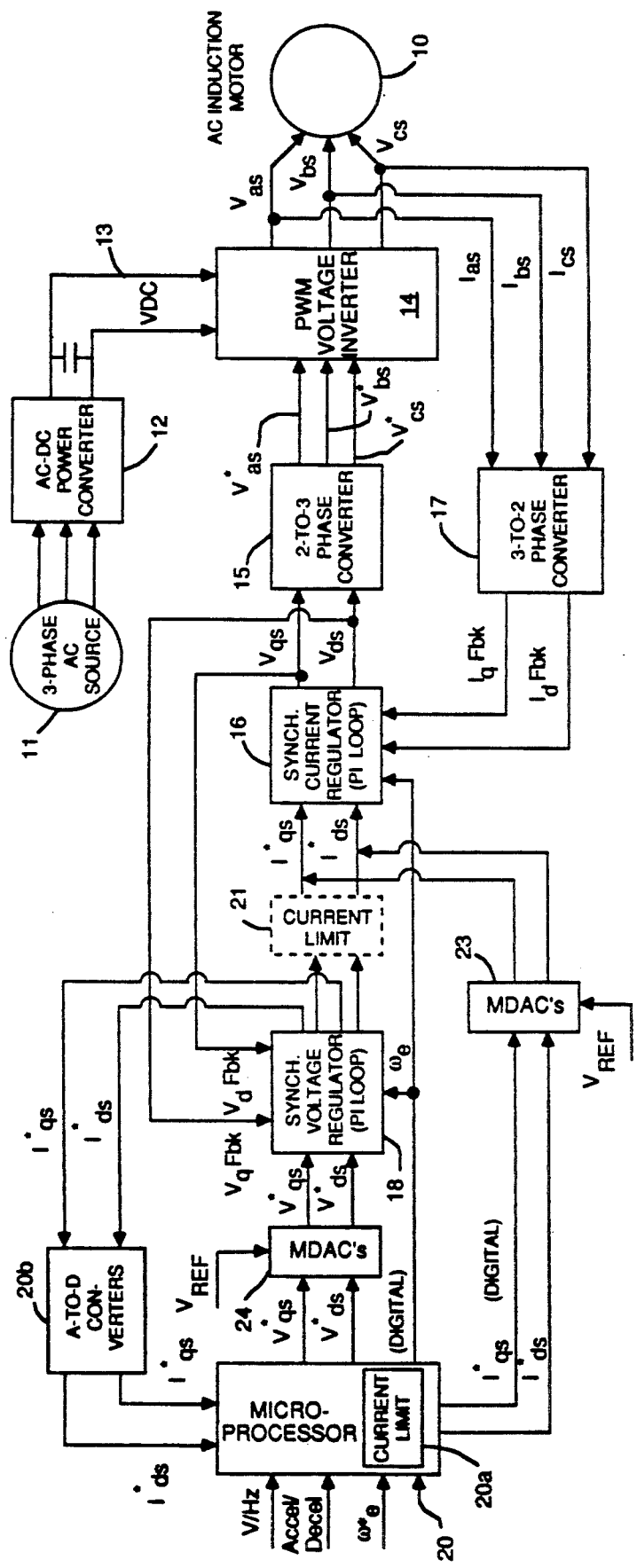
FIG. 1 is a circuit diagram of a first embodiment of the invention in which a voltage regulator is an analog circuit.
Figure 2:
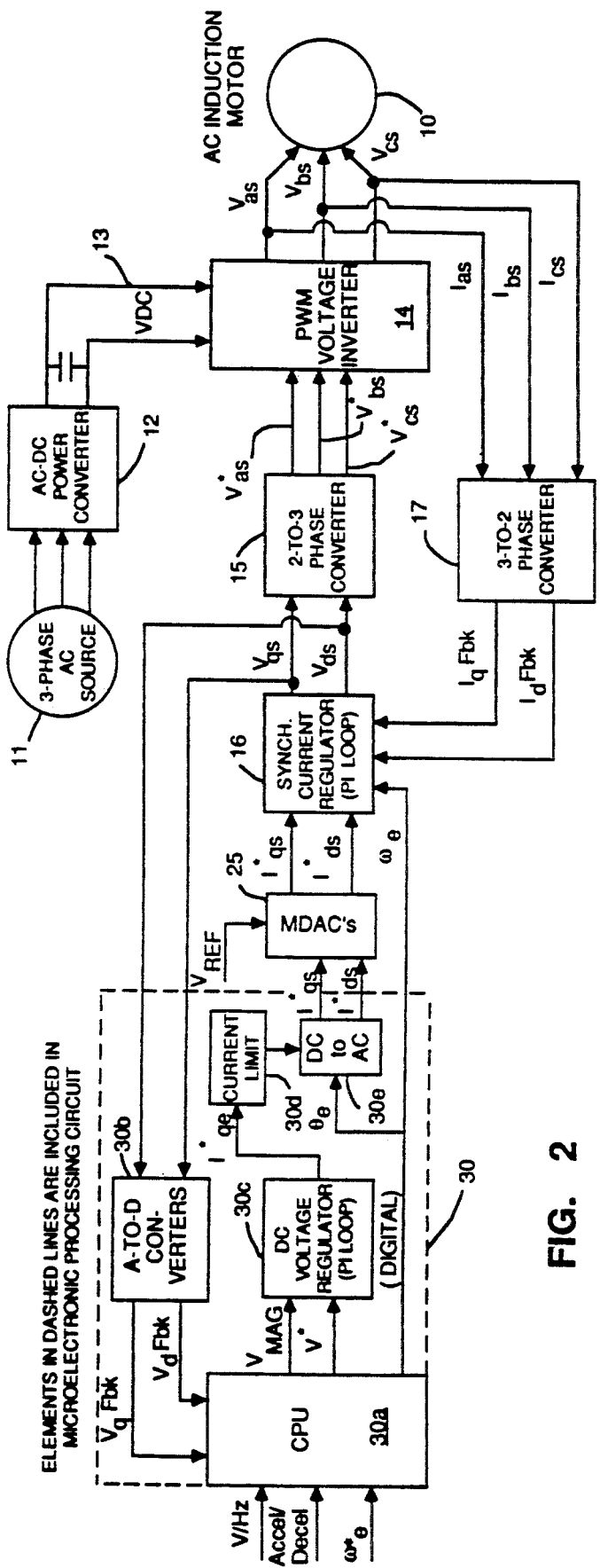
FIG. 2 is a circuit diagram of a second embodiment of the invention in which a DC voltage regulator is carried out within a microelectronic processing circuit.
Figure 3:
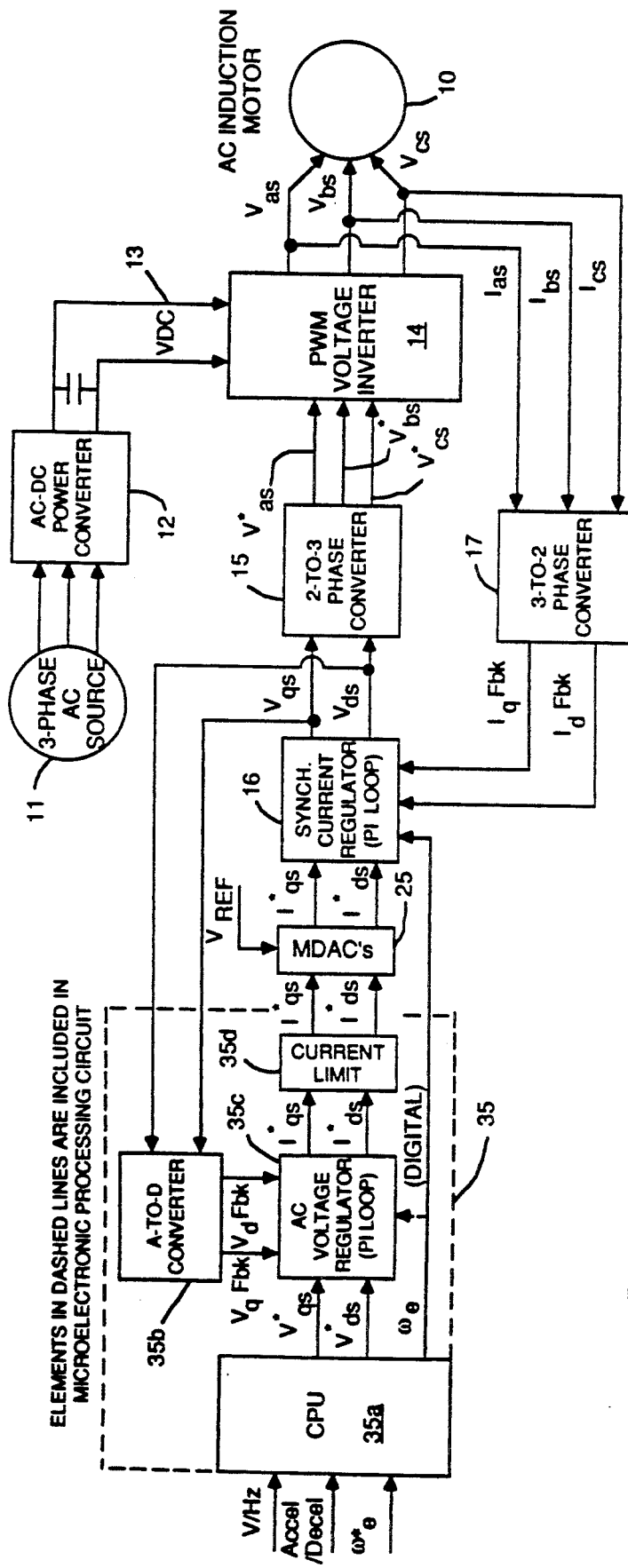
FIG. 3 is a circuit diagram of a third embodiment of the invention in which an AC voltage regulator is carried out within a microelectronic processing circuit.

FIGS. 1-3 illustrate three embodiments of the invention. All three relate to a current-regulated pulse width modulation (CRPWM) motor control for an AC induction motor 10 The motor control (also called a "drive") includes a power section that receives power at a line frequency of 60 Hz from a 3-phase AC power source 11. The three phases of the power source are connected to an AC-DC power converter 12 in the power section of the drive. The AC-DC power converter 12 rectifies the alternating current signals from the AC source 11 to produce a DC voltage (VDC) on a DC bus 13 that connects to power inputs on the pulse width modulation (PWM) voltage inverter 14, which completes the power section of the drive. The AC source 11, the AC-DC power converter 12, and DC bus 13 provide a DC source for generating a DC voltage of constant magnitude. The PWM inverter 14 includes a group of switching elements which are turned on and off to convert this DC voltage to pulses of constant magnitude.

The pulse train pattern from a PWM inverter is characterized by a first set of positive-going pulses of constant magnitude but of varying pulse width and by a second set of negative-going pulses of constant magnitude but of varying pulse width. The RMS value of this pulse train pattern approximates one cycle of a sinusoidal signal which is characteristic of an AC waveform. The pattern is repeated to generate additional cycles of the AC waveform.

To control the frequency and, magnitude of the resultant AC power signals to the motor, AC inverter phase control signals are applied to the PWM inverter. The PWM voltage inverter 14 receives three balanced AC inverter phase control signals, $V^*_{as}$, $V^*_{bs}$ and $V^*_{cs}$ which vary in phase by 120°, and the magnitude and frequency of these signals determines the pulse widths and the number of the pulses in pulse trains $V_{as}$, $V_{bs}$ and $V_{cs}$ which are applied to the terminals of the motor. The asterisk in the first set of signals denotes a "command" signal. The "s" subscript in both sets of signals denotes that these signals are referred to the stationary reference frame, where the voltages would be the phase voltage signals incorporated in the line-to-line voltages observed across the motor terminals.

These AC inverter phase control signals, $V^*_{as}$, $V^*_{bs}$ and $V^*_{cs}$ are produced as a result of a 2-phase to 3-phase conversion which is accomplished with a 2-to-3 phase converter 15. This circuit is known in the art, and for the purpose of this description it is sufficient to know that signals $V_{qs}$ and $V_{ds}$ are sinusoidal AC inverter voltage control signals having a magnitude and a frequency. These signals are related to a d-q reference frame in which the phase angle of the q-axis component and the phase angle of the d-axis component are 90° apart.

The AC inverter voltage control signals $V_{qs}$ and $V_{ds}$ are output signals from a synchronous current regulator 16. The details of this circuit 16 have been previously shown and described in Kerkman et al., U.S. Pat. No. 4,680,695 issued Jul. 14, 1987. The synchronous current regulator 16 includes a proportional-integral loop with summing inputs. At one summing input, an AC current command signal related to the q-axis, $I^*_{qs}$, is algebraically summed with an $I_q$ Fbk signal related to the q-axis. At a second summing input, an AC current command signal related to the d-axis, $I^*_{ds}$, is algebraically summed with an $I_d$ Fbk signal related to the d-axis. The electrical operating frequency in radians ($\omega e$) is also an input signal to both the q-axis and d-axis branches of the circuit. With these input signals, the synchronous current regulator 16 controls the AC inverter voltage control signals $V_{qs}$ and $V_{ds}$ at its outputs in response to current error, and further, it maintains the relationship of the output signals to the d-axis and the q-axis.

To obtain the $I_q$ Fbk and $I_d$ Fbk signals, current sensing devices (not shown) are used to sense the phase currents $I_{as}$, $I_{bs}$ and $I_{cs}$ flowing to the motor terminals. These signals are fed back to a 3-to-2 phase converter 17 for converting these signals to feedback signals $I_q$ Fbk and Id Fbk that are related to the d-q frame of reference. Such circuits are known in the art and the details are not essential to this description.

Thus far, the description has related to elements which are known in the art and which are shown in each of the three examples in FIGS. 1-3. The invention involves the addition to the synchronous current regulator 16 of a voltage regulator 18 and voltage control loop.

Referring to the first embodiment in FIG. 1, a synchronous voltage regulator 18, is added to drive the synchronous current regulator 16 and to produce AC current command signals, $I^*_{qs}$ and $I^*_{ds}$. The synchronous voltage regulator 18 is connected to the synchronous current regulator 16 through a current limit circuit 19 which may be a hardware circuit 21 or which may be implemented by executing a program 20a in a microprocessor 20. This first preferred embodiment is based on the execution of the current limit 20a in the microprocessor 20.

The voltage regulator 18 contains the same circuitry as the synchronous current regulator 16, and thus the circuit disclosed in Kerkman et al., U.S. Pat. No. 4,680,695, cited above, is used for this analog version of the voltage regulator 18. The voltage regulator 18 receives AC voltage command signals $V^*_{qs}$ and $V^*_{ds}$ and algebraically sums these signals with feedback signals $V_q$ Fbk and $V_d$ Fbk for the q-axis and d-axis, respectively. The feedback signals $V_q$ Fbk and $V_d$ Fbk are the AC inverter voltage control signals $V_{qs}$ and $V_{ds}$ which are sensed at the outputs of the synchronous current regulator 16 and returned through two circuit paths to summing inputs within the voltage regulator 18. The synchronous voltage regulator 18 also receives the electrical operating frequency in radians ($\omega e$) in the form of digital data from the microprocessor 20. This data is applied through multiplier circuits within the regulator 18 as described for the current regulator disclosed in Kerkman et al., U.S. Pat. No. 4,680,695, cited above. With these inputs, the voltage regulator 18 controls the AC current command signals $I^*_{qs}$ and $I^*_{ds}$ at its outputs in response to voltage error, and further, these output signals are referred to the d-q axes.

Although this embodiment includes a synchronous voltage regulator 18, a stationary voltage regulator can also be used. With a stationary voltage regulator, the inputs are the same as shown in FIG. 1, except that the input for $\omega_e$ would be dropped. This can be implemented in the circuit in FIG. 1 by setting $\omega_e = 0$ at the output of the microprocessor 20. This eliminates a cross-coupled component from the outputs from the voltage regulator 18, but the resulting stationary voltage regulator 18 is suitable for providing the necessary current commands to the current regulator 16.

Before the signals from the voltage regulator 18 are applied to the inputs of the current regulator 16, they are subject to current limiting operations. To carry out this operation in the microprocessor 20, the analog signals $I^*_{qs}$ and $I^*_{ds}$ at the outputs of the voltage regulator 18 are fed back to analog-to-digital converters 20b, where the signals are converted to digital values for $I^*_{qs}$ and $I^*_{ds}$ for input to the microprocessor 20. Many suitable analog-to-digital converters 20b are known in the art. In this embodiment, the analog-to-digital converters 20b may be integrated in a single circuit with the microprocessor 20 where the microelectronic circuit is the Model 8096 offered by Intel Corporation of Santa Clara, Calif. The microprocessor 20 compares the commanded values for $I^*_q$, $I^*_d$ with certain maximum values, and if these maximum values are exceeded, the values for $I^*_q$ and $I^*_d$ are reduced to the maximum current limits. The microprocessor 20 then outputs the current-limited values of $I^*_q$ and $I^*_d$ to a pair of multiplying digital-to-analog converter (MDAC) circuits 23. A commercial version of such a circuit is the AD 7524 multiplying digital-to-analog converter offered by Analog Devices, Norwood, Mass.

The microprocessor 20 generates digital values for $I^*_q$ or $I^*_d$ which are instantaneous values of AC signals in the form of $I^* \cos \theta_e$ and $-I^* \sin \theta_e$, respectively. The series of digital values follows the functions $I^* \cos \omega_e t$ and $-I^* \sin \omega_e t$. These values are multiplied by $V_{REF}$ to arrive at the proper signal level for input to the synchronous current regulator 16. Each MDAC circuit 23 multiplies a voltage reference signal, $V_{REF}$ by a series of digital values for $I^*_{qs}$ or $I^*_{ds}$. The signals resulting from the conversion through MDAC circuits 23 are designated $I^*_{qs}$ and $I^*_{ds}$ and are AC input signals to the synchronous current regulator 16.

The microprocessor 20 also generates digital values for $V^*_{qs}$ or $V^*_{ds}$ which are instantaneous values of AC signals in the form of $V^* \cos \theta$hd e and $-V^* \sin \theta_e$, respectively. The series of digital values follows the functions $V^* \cos \omega_e t$ and $-V^* \sin \omega_e t$. These values are transmitted via a digital data bus to a second pair of MDAC circuits 24, where they are multiplied by $V_{REF}$ to arrive at AC signals $V^*_{qs}$ and $V^*_{ds}$ of the proper signal level for input to the synchronous voltage regulator 18. The Model AD 7524 circuits mentioned above are also suitable for use as the MDAC circuits 24.

The microprocessor 20 calculates the motor voltage command values $V^*_q$ and $V^*_d$ in response to one of several switch-selectable rates of acceleration and deceleration (accel/decel rates). The switches are interfaced to the microprocessor 20. The magnitude of the motor voltage command is also determined by a voltage/hertz ratio, which is a multiplier applied to the frequency determined by the accel/decel rates. The voltage/hertz ratio is set to a predetermined ratio by connecting a jumper wire on an input interface so that an input signal is read by the microprocessor 20. Another input to the microprocessor 20 in FIGS. 1-3 represents inputs from two potentiometers which determine a range for the operating frequency $\omega^*_e$, such as 0-90 Hz, for example, but expressed in radians ($2\pi \times$ frequency in Hz). Within this range the microprocessor 20 generates various values of $\omega_e$ as the motor is brought up to a rated frequency such as 60 Hz for example.

The motor control system described in FIG. 1 exhibits improved response to load disturbances because the voltage regulator 18 senses a voltage drop at the motor terminals by sensing a drop in voltages $V_{qs}$ and $V_{ds}$ at the outputs of the synchronous current regulator 16. A voltage drop at the motor terminals is reflected back to the outputs of the current regulator 16. A voltage feedback loop is closed around the synchronous current regulator 16 with the input to the regulator 16 being controlled by the voltage regulator 18. If a load disturbance calls for greater than maximum current at a reduced voltage, this is sensed at the outputs of the current regulator 16 through the voltage regulator 18. The current limiting circuit 20a, 21 limits current to the maximum allowable current for the voltage at the motor terminals. This limit is selected as something less than the overcurrent which would cause the operation of an overload protection circuit. Such an overload protection circuit causes the shut down or other substantial interruption of steady-state motor operation and it is an object of the invention to provide a more refined response to transient conditions than is presently available with the overload protection circuit.

Referring next to FIGS. 2 and 4, an alternative embodiment of the same control arrangement provides fuller utilization of a microelectronic processing circuit 20 to reduce the analog circuitry in the system. In this embodiment, the microelectronic processing circuit 30 includes a CPU (central processing unit) 30a and A-to-D converters 30b. The CPU 30a executes a program stored in nonvolatile memory to emulate a DC voltage regulator 30c and a current limit circuit 30d. In executing this program the CPU 30a utilizes a random access memory (RAM) (not shown) to store data and temporary results. The inputs to the microprocessor for the volts/hertz ratio, accel/decel rates and operating frequency $\omega^*_e$ are the same as for the example in FIG. 1. Also like the example in FIG. 1, the microelectronic processing unit includes the CPU 30a and the A-to-D converters 30b, and further is programmable to provide a DC voltage regulator 30c and a current limit function 30d to be described.

Referring next to FIG. 4, the CPU 30a executes a program having a main program loop 40 for handling background functions. Also during the main loop, the CPU 30a reads the digital values for $V_{qs}$ and $V_{ds}$ from the A-to-D converters 30b. As seen in FIG. 2, the A-to-D converters 30b receive the analog feedback signals $V_{qs}$ and $V_{ds}$ from the outputs of the synchronous current regulator 16, as described for the first example, and convert these to the digital values $V_q$ Fbk and $V_d$ Fbk. These are read by the CPU 30a and saved in RAM memory (not shown). Returning to FIG. 4, the reading of the digital voltage feedback signals is represented by process block 41 in the main loop 40 of the program executed by the CPU 30a. As represented by decision block 42, when a timer, which may be a programmable hardware timer or a simply a timing routine in the program, times out and generates an interrupt signal, the CPU 30a branches to an interrupt portion of the microprocessor program. The beginning of this interrupt portion is represented by process block 43, which further represents the execution of instructions in the program to update the operating frequency $\omega_e$, and the phase angle of excitation, $\theta_e$, according to the following equations:

$$\omega_e(t) = \omega_e(t-1) + \Delta\omega_e \quad (1)$$

$$\theta_e(t) = \theta_3(t-1) + \omega_e(t) \Delta T \quad (2)$$

In equations (1) and (2), (t) is a present time and (t−1) is a previous time. The accel/decel rate determines $\Delta\omega_e$ as a function of time, $\theta e$ is the phase angle or instantaneous value for a function of the form sin $\theta_e(t)$, and $\Delta T$ is the elapsed time since the last update.

Next, as represented by process block 44, the CPU 30a executes instructions to determine a DC value for a motor voltage command V* according to the following equation:

$$V^* = \omega_e(t)/2\pi \times (V/Hz) \quad (3)$$

where (V/Hz) is the volts/hertz ratio.

This value is compared against a voltage limit $V_{max}$ as represented by decision block 45. If V* is greater than $V_{max}$, as represented by the "YES" result, then V* is reduced to $V_{max}$ as represented by process block 46. If V* is not greater than $V_{max}$, as represented by the "NO" result, the program proceeds directly to process block 47. As represented by process block 47, the CPU 30a executes a subroutine which retrieves the digital values for $V_{qs}$ and $V_{ds}$ from memory, squares each value, sums the two squared values and then takes the square root of the sum to determine a single DC magnitude for a feedback voltage, which shall be referred to as $V_{MAG}$.

Referring back to FIG. 2, it will be seen that the voltage-limited value of V* and the value for $V_{MAG}$ are inputs to the portion of the program that is executed to emulate a DC voltage regulator 30c. The output of this regulator 30c is a DC signal $I^*_{qe}$, for commanding current from the synchronous current regulator 16.

The $I^*_{qe}$ signal is current-limited by executing the current limit portion 30d of the program, and is then applied to a DC-to-AC portion 30e of the program which converts the $I^*_{qe}$ signal to a pair of AC command signals $I^*_q$ and $I^*_d$ having a phase difference of 90°. The CPU 30a generates digital values for $\theta_e$ which are applied as a second input to the DC-to-AC portion 30e of the program. The resulting command signals $I^*_{qs}$ and $I^*_{ds}$ are then applied to a pair of MDAC circuits 25 and multiplied by $V_{REF}$ to convert the digital outputs of the microelectronic processing circuit 30 to analog signals for input to the synchronous current regulator 16.

This is also represented in FIG. 4, where process block 48 represents the execution of program instructions to perform the voltage regulation loop according to the following equations:

$$I_{integ}(t) = I_{integ}(t-1) + K_I(V^* - V_{MAG}) \quad (4)$$

$$I^*_{qe} = I_{integ}(t) + K_P(V^* - V_{MAG}) \quad (5)$$

where $I_{integ}$ (t) is the value of an integral at some time "t" and $I_{integ}$ (t-1) is the value of the integral at some earlier time "t-1", where $K_I$ is a gain factor applied to the voltage error, $(V^* - V_{MAG})$, and where $K_P$ is a proportional gain factor applied to the voltage error.

Next in FIG. 4, as represented by decision block 49, the DC value of the current command $I^*_{qe}$ is tested to determine if it is greater than a DC current limit $I^*_q$ max. If $I^*_{qe}$ is greater than $I^*_q$ max, as represented by the "YES" result, then $I^*_{qe}$ is reduced to $I^*_q$ max as represented by process block 50, and the program proceeds to process block 51. If $i^*_{qe}$ is not greater than $I^*_q$ max, as represented by the "NO" result, the program proceeds directly to process block 51.

As represented by process block 51, the AC output commands are formed according to the following equations:

$$I^*_{qs} = I^*_{qe} \times \cos(\theta_e) \quad (6)$$

$$I^*_{ds} = -I^*_{qe} \times \sin(\theta_e) \quad (7)$$

The AC commands $I^*_q$ and $I^*_d$ are outputs from the microelectronic processing circuit 30 to the MDAC circuits 25 in FIG. 2. As represented in FIG. 4 after the AC current commands have been formed and transmitted, as represented by I/O block 52, the CPU 30a returns from the interrupt portion of the program to the main loop 40.

The motor control system described in FIG. 2 responds to a voltage drop at the motor terminals by sensing a drop in voltages $V_{qs}$ and $V_{ds}$ at the outputs of the synchronous current regulator 16. A voltage feedback loop is closed around the synchronous current regulator 16 with the input to the regulator 16 being controlled by a microelectronic processing circuit that emulates the voltage regulator 30c. If a load disturbance calls for greater than maximum current at a reduced voltage, this is sensed at the outputs of the current regulator 16 through the voltage regulator 30c. The current limiting portion 30d of the processor operation limits current to the maximum allowable current for the voltage at the motor terminals. This limit is selected at something less than the overcurrent which would cause the operation of an overload protection circuit.

FIG. 3 shows a third embodiment of the invention in which a microelectronic processing unit 35 executes instructions to provide voltage regulation of AC quantities. In this embodiment, the microelectronic processing circuit 35 includes a CPU (central processing unit) 35a and A-to-D converters 35b. The CPU 35a executes a program stored in nonvolatile memory (not shown) to emulate an AC voltage regulator 35c and a current limit circuit 35d. In executing this program the CPU utilizes a random access memory (RAM) (not shown) to store data and temporary results. The inputs to the CPU 35a for the volts/hertz ratio, accel/decel rates and operating frequency $\omega^*_e$ are the same as for the example in FIGS. 1 and 2. Also like the example in FIG. 2, the microelectronic processing unit includes the CPU 35a and the A-to-D converters 35b, and further is programmable to provide an AC voltage regulator 35c and a current limit circuit 35d to be described.

Figure 5:
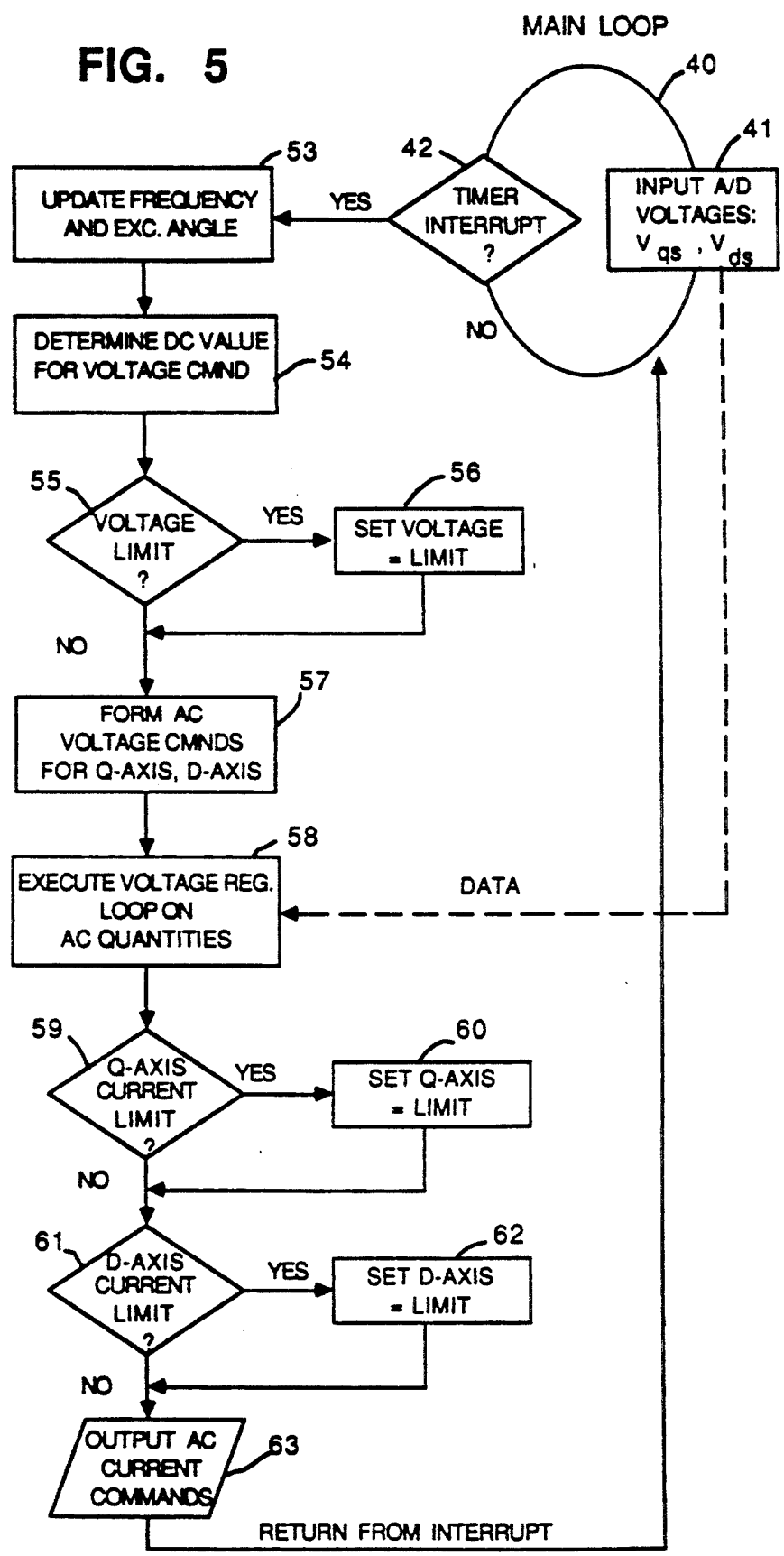
FIG. 5 is a flow chart showing a program for carrying out the embodiment of FIG. 3.

Referring also to FIG. 5, the CPU 35a also executes a program having the main program loop 40 for handling background functions. Also during the main loop, the CPU 35a reads the digital values for $V_{qs}$ and $V_{ds}$ from the A-to-D converters 30b, which are designated $V_q$ Fbk and $V_d$ Fbk in FIG. 3. As seen in FIG. 3, the A-to-D converters 30b receive the analog feedback signals $V_{qs}$ and $V_{ds}$ from the outputs of the synchronous current regulator 16, as described for the previous example, and convert these to the digital values $V_q$ Fbk and $V_d$ Fbk. These are saved in RAM memory (not shown) for later use in executing the AC voltage regulator function.

Returning to FIG. 5, the reading of the voltage feedback signals is represented by process block 41 in the main loop 40 of the program executed by the CPU 35a. As represented by a decision block 42, when a timer, which may be a programmable hardware timer or a simply a timing routine in the program times out and generates an interrupt signal, the CPU 35a branches to an interrupt portion of the microprocessor program. The beginning of this interrupt portion is represented by process block 53, which further represents the execution of instructions in the program to update the operating frequency $\omega_e$, and the phase angle of excitation, $\theta_e$, according to equations (1) and (2) set forth earlier in this description.

Next, as represented by process block 54, the CPU 35a executes instructions to determine a DC value for a motor voltage command V* according to equation (3) set forth earlier in this description, by multiplying the frequency determined from the accel/decel rate by the volts/hertz ratio.

This value is compared against a voltage limit $V_{max}$ as represented by decision block 55. If V* is greater than $V_{max}$, as represented by the "YES" result, then V* is reduced to $V_{max}$ as represented by process block 56. If V* is not greater than $V_{max}$, as represented by the "NO" result, the program proceeds directly to process block 57. As represented by process block 57, the CPU 35a executes instructions to form AC motor voltage commands related to the q-axis and to the d-axis according to the following equations:

$$V^*_{qs} = V^* \cos(\theta_e) \qquad (8)$$

$$V^*_{ds} = -V^* \sin(\theta_e) \qquad (9)$$

As seen in FIG. 3, $V^*_{qs}$ and $V^*_{ds}$ become the inputs to the voltage regulator portion 35c of microprocessor operation. The outputs of this regulator 35c are AC signals $I^*_{qs}$ and $I^*_{ds}$ for commanding current from the synchronous current regulator 16. The $I^*_{qs}$ and $I^*_{ds}$ signals are current-limited by executing the current limit portion 35d of the microprocessor program, and are then output to the MDAC's 25 which convert the digital output commands to analog command signals $I^*_{qs}$ and $I^*_{ds}$ which are applied to the synchronous current regulator 16.

The execution of an AC voltage regulator 35c is also represented in FIG. 5, where process block 58 represents the execution of program instructions to perform the voltage regulation loop. For a synchronous AC voltage regulator, the voltage regulation loop is executed according to the following state equations:

$$(d/dt)X_{qds} = K_I (V^*_{qds} - V_{qds}) + [\omega_e x] X_{qds} \qquad (10)$$

$$I^*_{qds} = X_{qds} + K_P (V^*_{qds} - V_{qds}) \qquad (11)$$

where $I^*_{qds}$ represents the two commands $I^*_{qs}$ and $I^*_{ds}$,
$V^*_{qds}$ represents the two commands $V^*_{qs}$ and $V^*_{ds}$,
and $V_{qds}$ represents the two feedback signals for $V_{qs}$ and $V_{ds}$,
where $K_I$ is a gain factor applied to integration of voltage error, $(V^*_{qds} - V_{qds})$,
where $K_P$ is a proportional gain factor applied to the voltage error,
where $X_{qds}$ represents an auxiliary system state (a mathematical expression) for the motor control system, and
where $[\omega_e x]$ represents a frequency-dependent multiplier which may be represented as a 2×2 matrix with terms $0, \omega_e, -\omega_e$ and $\mathbf{O}$, respectively For a further explanation of the formulas and theory for the synchronous current regulator which is applied here to the regulation of voltage, reference is made to Rowan and Kerkman, "A New Synchronous Current Regulator and an Analysis of Current Regulated PWM Inverters" *IEEE Trans. on Industry Applications* IAS Vol. 1A-22, No. 4, July–August 1986 pp. 678–690.

A stationary regulator could also be used for the AC voltage regulator 35c of FIG. 3. In such a case, equations 10) and 11) above would also apply for execution of the voltage loop, except that the term $[\omega_e x] X_{qds}$ in equation 10) would be zero. In FIG. 3, the dashed arrow input to the voltage regulator 35c for $\omega_e$ represents the optional nature of this input according to whether the synchronous or stationary ($\omega_e = 0$) regulator is selected.

Next in FIG. 5, as represented by decision block 59, the magnitude of the current command $I^*_{qs}$ is tested to determine if it is greater than a current limit $I^*_{max}$. If $I^*_{qs}$ is greater than $I^*_{max}$, as represented by the "YES" result, then $I^*_{qs}$ is reduced to $I^*_{max}$ as represented by process block 60, and the program proceeds to process block 61. If $I^*_{qs}$ is not greater than $I^*_{max}$, as represented by the "NO" result, the program proceeds directly to process block 61. In this instance the current command $I^*_{qs}$ signal is formed by multiplying the current-limited magnitude of $I^*_{qs}$ by the proper sign (+ or −).

Then, as represented by decision block 61, the magnitude of the current command $I^*_{ds}$ is tested to determine if it is greater than a current limit $I^*_{max}$. If $I^*_{ds}$ is greater than $I^*_{max}$, as represented by the "YES" result, then $I^*_{ds}$ is reduced to $I^*_{max}$ as represented by process block 62, and the program proceeds to process block 63. If $I^*_{ds}$ is not greater than $I^*_{max}$, as represented by the "NO" result, the program proceeds directly to process block 63. In this instance the current command $I^*_{ds}$ signal is formed by multiplying the current-limited magnitude of $I^*_{ds}$ by the proper sign (+) or (−).

As represented by I/O block 63, the AC commands $I^*_{qs}$ and $I^*_{ds}$ are then transmitted to the MDAC's 25 in FIG. 3 and the the CPU 35a returns from the interrupt portion of the program to the main loop 40.

The motor control described in FIG. 3 senses a voltage drop at the motor terminals by sensing a drop in voltages $V_{qs}$ and $V_{ds}$ at the outputs of the synchronous current regulator 16. A voltage feedback loop is closed around the synchronous current regulator 16 with the input to the regulator 16 being controlled by the microelectronic processing circuit in functioning as the AC voltage regulator 35c. If a load disturbance calls for greater than maximum current at a reduced voltage, this is sensed by the microelectronic processing unit 35. The current limiting portion 35d of the processor operation limits current to the maximum allowable current for the voltage at the motor terminals. This limit is selected at something less than the overcurrent which would cause the operation of an overload protection circuit.

Figure 3A:
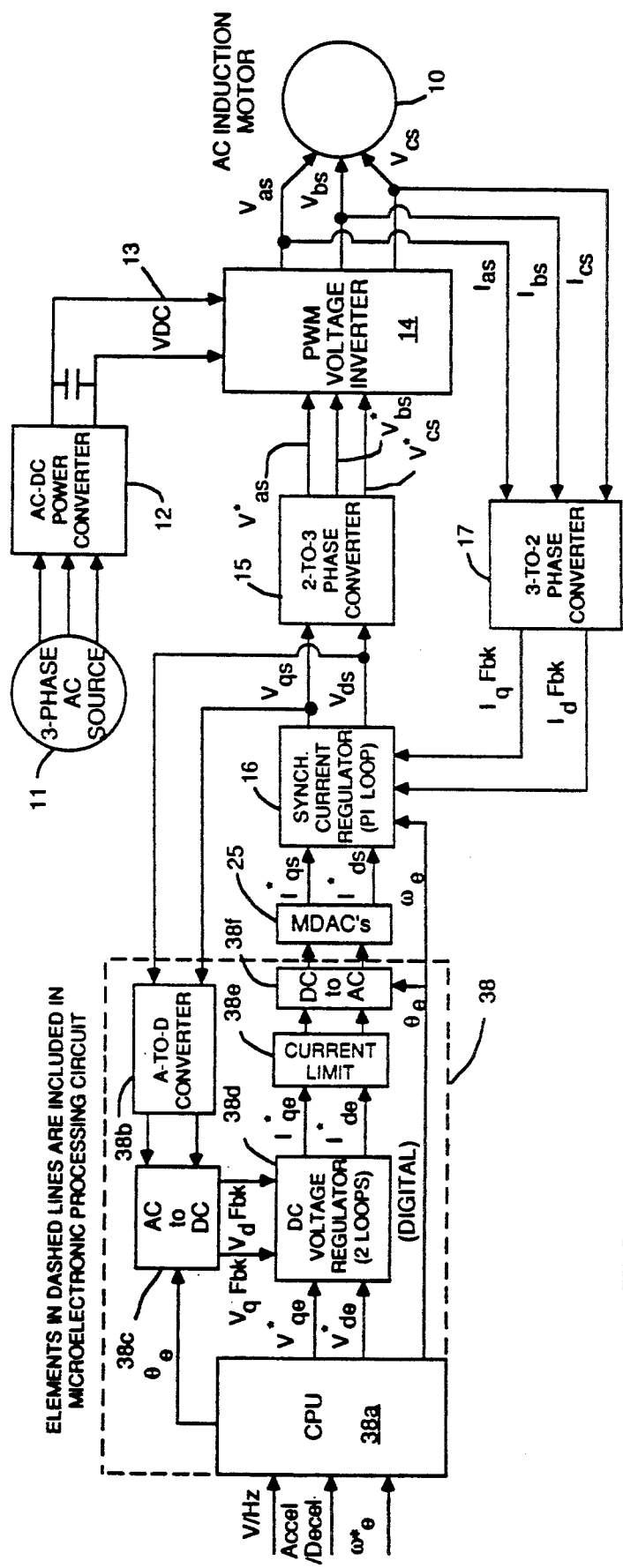
FIG. 3a is a circuit diagram of a fourth embodiment of the invention in which a second type of DC voltage regulator is carried out within a microelectronic processing circuit.

A fourth embodiment of the invention is shown in FIG. 3a. This embodiment is a variation of the second embodiment shown in FIG. 2. In this embodiment, a DC voltage regulator 38d is incorporated in a microelectronic processing circuit 38. In FIG. 2, the DC voltage regulator 30c operated on a magnitude $V_{MAG}$ which did not contain phase information. In FIG. 3a, the AC voltage signals $V^*_{qs}$ and $V^*_{ds}$ are fed back to an A-to-D converter 38b similar to the example shown in FIG. 2. From there the digitized AC feedback signals are converted—by executing an AC-to-DC transformation portion 38c in the microprocessing program to two digitized DC feedback signals $V_q$ Fbk and $V_d$ Fbk. To execute the AC-to-DC transformation, the CPU 38a must also generate digital values for $\theta_e$ to the AC-to-DC transformation portion 38c in the microprocessing program. The feedback signals $V_q$ Fbk and $V_d$ Fbk are compared with two DC command signals, $V^*_{qe}$ and $V^*_{de}$ which are related to the respective q-axis and d-axis feedback signals. This provides two summing points and two DC control loops which produce two DC current command signals $I^*_{qe}$ and $I^*_{de}$ as outputs from the voltage regulator 38d.

The $I^*_{qe}$ and $I^*_{de}$ signals are current-limited by executing the current limit portion 38e of the program, and are then applied to a DC-to-AC transformation portion 38f of the program which converts the $I^*_{qe}$ and $I^*_{de}$ signals to a pair of AC command signals $I^*_{qs}$ and $I^*_{ds}$ having a phase difference of 90°. These signals are output to the MDAC's 25 for conversion to the analog command signals $I^*_{qs}$ and $I^*_{ds}$ that are inputs to the synchronous current regulator 16 as in the previous examples.

In the example in FIG. 3a, a voltage feedback loop with a DC voltage regulator and two parallel branches is closed around the synchronous current regulator 16 with the input to the regulator 16 being controlled by the microelectronic processing circuit 38.

This description has been by way of example of how the invention can be carried out. Those with experience in the art will recognize that various details may be modified in arriving at other detailed embodiments, and that many of these embodiments will come within the scope of the invention. Therefore to apprise the public of the scope of the invention and the embodiments covered by the invention the following claims are made.

We claim:

1. A pulse width modulation (PWM) motor control for improved control of current to an induction motor without sensing the rotational speed of the motor, the control comprising:

current regulation means for generating AC inverter voltage control signals;

a PWM voltage inverter with outputs for electrical connection to the induction motor, the PWM inverter being responsive to a DC voltage signal from a DC power source and responsive to AC inverter voltage control signals from the current regulation means to generate a voltage that is applied to the induction motor during operation of the induction motor;

voltage feedback means for sensing changes in the voltage applied to the induction motor during operation of the induction motor;

conversion means coupled to the voltage feedback means for converting the changes in the voltage sensed through the voltage feedback means to a corresponding plurality of digital voltage feedback values;

microelectronic processing means coupled to the conversion means for calculating a single DC value for voltage feedback in response to the plurality of digital voltage feedback values;

voltage regulation means for controlling AC current command signals to the current regulation means in response to the DC value for voltage feedback; and wherein the current regulation means generates the AC inverter voltage control signals in response to the AC current command signals and in response to current feedback signals that are in turn responsive to actual current being supplied from the outputs of the PWM voltage inverter.

2. The PWM motor control of claim 1, wherein the voltage feedback means senses changes in the voltage applied to the induction motor during operation by sensing AC inverter control signals which control the voltage that is applied to the induction motor during operation.

3. The PWM motor control of claim 1, further comprising current limiting means between the voltage regulation means and the current regulation means for limiting the AC current command signal to the current regulation means to a maximum level allowed for the voltage at the terminals of the induction motor.

4. The PWM motor control of claim 3, wherein the current limiting means is a means included within the microelectronic processing means.

5. A pulse width modulation (PWM) motor control for improved control of current to an induction motor without sensing the rotational speed of the motor, the control comprising:

current regulation means for generating AC inverter voltage control signals in q-axis and d-axis components;

a PWM voltage inverter with outputs for electrical connection to the induction motor, the PWM inverter being responsive to a DC voltage signal from a DC power source and responsive to the AC inverter voltage control signals in q-axis and d-axis components to produce a voltage that is applied to the induction motor during operation of the induction motor;

voltage feedback means for sensing a change in the voltage applied to the induction motor during operation of the induction motor;

conversion means coupled to the voltage feedback means for converting the change in the voltage sensed through the voltage feedback means to digital voltage feedback values;

microelectronic processing means for generating AC values for motor voltage in response to a predetermined acceleration/deceleration rate and in response to a predetermined volts/hertz ratio;

AC voltage regulation means for controlling AC current command signals in q-axis and d-axis components to the current regulation means in response to the AC values generated by the microelectronic processing means and in response to the digital voltage feedback values received from the conversion means; and wherein the current regulation means generates the AC inverter voltage control signals in q-axis and d-axis components in response to the AC current command signals in q-axis and d-axis components and in response to current feedback signals that are in turn responsive to actual current being supplied from the outputs of the PWM voltage inverter.

6. The PWM motor control of claim 5, wherein the AC voltage regulation means is included as a means within the microelectronic processing means.

7. The PWM motor control of claim 5, further comprising current limiting means between the AC voltage regulation means and the current regulation means for limiting the AC current command signal to the current regulation means to a maximum level allowed for the voltage at the terminals of the induction motor as sensed through the voltage feedback means and the voltage regulation means.

8. The PWM motor control of claim 7, wherein the current limiting means is a means included within the microelectronic processing means.

9. A pulse width modulation (PWM) motor control for improved control of current to an induction motor without sensing the rotational speed of the motor, the control comprising:

current regulation means for generating AC inverter voltage control signals, the current regulation means having outputs at which the AC inverter voltage control signals are generated, and wherein the AC inverter voltage control signals vary 90° in phase;

a PWM voltage inverter with outputs for electrical connection to the induction motor, the PWM inverter being responsive to a DC voltage signal from a DC power source and responsive to the AC inverter voltage control signals to produce a voltage that is applied to the induction motor during operation of the induction motor;

voltage feedback means for sensing changes in the AC voltage applied to the induction motor during operation of the induction motor;

conversion means coupled to the voltage feedback means for converting the changes in the AC voltage to a plurality of digital voltage feedback values;

microelectronic processing means coupled to the conversion means, wherein the microelectronic processing means includes means for calculating DC feedback values from the digital voltage feedback values and wherein the microelectronic processing means includes means for generating two DC command signals corresponding to the AC inverter control signals which vary 90° in phase;

voltage regulation means for controlling AC current command signals to the current regulation means, wherein the DC feedback values are compared with the two respective DC command signals generated by the microelectronic processing means; and wherein the current regulation means generates AC inverter voltage control signals in response to the AC current command signals and in response to feedback signals that are in turn responsive to actual current being supplied from the outputs of the PWM voltage inverter.

* * * * *

UNITED STATES PATENT AND TRADEMARK OFFICE
CERTIFICATE OF CORRECTION

PATENT NO. : 5,140,248

DATED : August 18, 1992

INVENTOR(S) : Rowan, Kerkman

It is certified that error appears in the above-identified patent and that said Letters Patent is hereby corrected as shown below:

Col. 2, line 58    After "signal" insert --to the PWM inverter--.

Col. 3, line 49    After "10" insert --.--.

Col. 4, line 6     After "and" delete ",".

Col. 4, line 38    "$I^*_q S$" should be --$I^*_{qs}$--.

Col. 4, line 44    " e" should be --$_e$--.

Col. 4, line 55    "$\omega e$" should be --$\omega_e$--.

Col. 5, line 21    "Id" should be --$I_d$--.

Col. 6, line 10    Delete "hd".

Col. 7, Eq. 2      "$\theta 3$" should be --$\theta_e$--.

Col. 7, line 41    "$\theta e$" should be --$\theta_e$--.

Col. 8, Eq. 5      "Kp" should be --$K_p$--.

Col. 10, Eq. 11    "KP" should be --$K_p$--.

Col. 10, line 36   "O" should be --0--.

UNITED STATES PATENT AND TRADEMARK OFFICE
CERTIFICATE OF CORRECTION

PATENT NO. : 5,140,248

DATED : August 18, 1992

INVENTOR(S) : Rowan, Kerkman

It is certified that error appears in the above-identified patent and that said Letters Patent is hereby corrected as shown below:

Col. 10, line 36  Add period at end of sentence.

Col. 11, line 37  After "program" insert -- - --.

Signed and Sealed this

Fourteenth Day of December, 1993

*Attest:*

BRUCE LEHMAN

*Attesting Officer*     *Commissioner of Patents and Trademarks*